US008654416B2

(12) United States Patent
Masuda (10) Patent No.: US 8,654,416 B2
(45) Date of Patent: Feb. 18, 2014

(54) IMAGE READER

(75) Inventor: Satoshi Masuda, Neyagaw (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 142 days.

(21) Appl. No.: 13/384,533

(22) PCT Filed: Jul. 14, 2010

(86) PCT No.: PCT/JP2010/004556
§ 371 (c)(1),
(2), (4) Date: Jan. 17, 2012

(87) PCT Pub. No.: WO2011/007562
PCT Pub. Date: Jan. 20, 2011

(65) Prior Publication Data
US 2012/0113486 A1    May 10, 2012

(30) Foreign Application Priority Data

Jul. 16, 2009    (JP) ................................. 2009-167831

(51) Int. Cl.
| | |
|---|---|
| H04N 1/04 | (2006.01) |
| H04N 1/60 | (2006.01) |
| H04N 1/46 | (2006.01) |
| G06K 7/00 | (2006.01) |
| G06K 9/00 | (2006.01) |
| G02B 6/34 | (2006.01) |
| G02B 26/08 | (2006.01) |
| G03B 21/20 | (2006.01) |

(52) U.S. Cl.
USPC ............ 358/482; 358/1.9; 358/474; 358/505; 382/312; 382/181; 385/37; 359/204.1; 353/85

(58) Field of Classification Search
USPC ........... 358/482, 1.9, 474, 505; 382/312, 181; 385/37; 359/204.1; 353/85
See application file for complete search history.

(56) References Cited

U.S. PATENT DOCUMENTS 5,303,027 A    4/1994    Kuderer et al.
(Continued)

FOREIGN PATENT DOCUMENTS

| JP | 3-177156 | 8/1991 |
|---|---|---|
| JP | 5-56213 | 3/1993 |
| JP | 5-215607 | 8/1993 |
| JP | 10-51602 | 2/1998 |

(Continued)

OTHER PUBLICATIONS

"7600 pixels x 4 lines CCD linear sensor (color)", ILX146K, Sony CX-PAL (vol. 65), pp. 12-13, published Jul. 2005, with English translation.
Office Action (and an English Translation thereof) dated Oct. 29, 2013 issued in the corresponding Japanese Patent Application No. 2011-522732.

*Primary Examiner* — Charlotte M Baker
*Assistant Examiner* — Rury Grisham
(74) *Attorney, Agent, or Firm* — Cozen O'Connor (57) ABSTRACT

A control unit 6 causes a vertical scanning circuit 3 to cyclically select any one-dimensional pixel line from among pixel lines 21 to 23 each time a prescribed H period elapses, and controls a read circuit 5 and a horizontal scanning circuit 4 so as to read out pixel signals of an object which has been exposed by the selected pixel line. The control unit 6 further controls a vertical movement unit 8 in such a manner that the scanning speed S satisfies S=P/4H, where P is the arrangement pitch in the vertical direction of the pixel lines 21 to 23 and H is the H period.

6 Claims, 9 Drawing Sheets

(56) References Cited

U.S. PATENT DOCUMENTS

| | | | |
|---|---|---|---|
| 6,122,412 A * | 9/2000 | Noguchi et al. | 382/312 |
| 6,181,819 B1 * | 1/2001 | Arimoto et al. | 382/181 |
| 6,198,562 B1 * | 3/2001 | Hayashi et al. | 359/204.1 |
| 7,339,699 B1 * | 3/2008 | Suzuki et al. | 358/1.9 |
| 8,345,330 B2 * | 1/2013 | Kanno et al. | 358/505 |
| 2002/0081068 A1 * | 6/2002 | Matsumoto et al. | 385/37 |
| 2007/0279505 A1 | 12/2007 | Iwamoto et al. | |
| 2011/0058230 A1 * | 3/2011 | Soeda et al. | 358/474 |
| 2013/0222774 A1 * | 8/2013 | Chikaoka | 353/85 |

FOREIGN PATENT DOCUMENTS

| | | |
|---|---|---|
| JP | 2002-142078 | 5/2002 |
| JP | 2002-369080 | 12/2002 |
| JP | 2007-312047 | 11/2007 |
| JP | 2007-336519 | 12/2007 |

* cited by examiner

IMAGE READER

RELATED APPLICATIONS

This is a U.S. national stage of application No. PCT/JP2010/004556, filed on Jul. 14, 2010.

This application claims the priority of Japanese application no. 2009-167831 filed Jul. 16, 2009, the entire content of which is hereby incorporated by reference.

TECHNICAL FIELD

The present invention relates to an image reader provided with a plurality of one-dimensional pixel lines.

BACKGROUND ART

In recent years, image readers have been known which obtain a color image by arranging one-dimensional pixel lines in a plurality of rows in a vertical direction, each pixel line having a plurality of pixels arranged in a horizontal direction, and moving this plurality of one-dimensional pixel lines in a vertical direction relatively to an original document.

For example, Patent Document 1 discloses a CCD type solid-state imaging apparatus which is capable of acquiring not only color images, but also black and white images, with high sensitivity and at high speed, by transferring pixel signals generated by first to third pixel lines having blue, green and red filters, by a CCD shift register.

However, the solid-state imaging apparatus according to Patent Document 1 uses a CCD system, and therefore it is essential to provide a transfer gate and a CCD shift register between each of the one-dimensional pixel lines, which means that there is a prescribed limit on reducing the arrangement pitch of the one-dimensional pixel lines in the vertical direction.

Consequently, if the solid-state imaging apparatus according to Patent Document 1 is applied to the image reader described above, then since the arrangement pitch of the one-dimensional pixel lines in the vertical direction is large, it is difficult to cause the one-dimensional pixel lines in each row to expose the same line of an original document, due to operational errors of the movement mechanism which moves the one-dimensional pixel lines at a prescribed scanning speed in the vertical direction relatively to the original document (for example, due to fluctuations in the scanning speed). As a result of this, color deviations occur. Therefore, it is desirable for the arrangement pitch between the one-dimensional pixel lines in the vertical direction to be small.

Therefore, Patent Document 2 discloses a linear sensor which in an R/B sensor array 12-2 comprising alternately arranged red and blue pixels and a G sensor array 12-1 comprising an arrangement of green pixels are disposed without gaps therebetween in the vertical direction.

In order to achieve this, in Patent Document 2, read-out gate sections 13-1 and 13-2 are arranged so as to be disposed on either side of the G sensor arrays 12-1, 12-2, and CCD analog shift registers 14-1 and 14-2 are arranged so as to be disposed on either side of the read-out gate sections 13-1 and 13-2.

However, Patent Document 2 only discloses a case where there are two sensor arrays and does not refer to a case where there are three or more sensor arrays. Therefore, it is not clear how the read-out gate sections and the CCD analog shift registers should be disposed if three or more sensor arrays are arranged without gaps therebetween in the vertical direction.

Furthermore, Non-Patent Document 1 discloses a CCD linear sensor in which an R sensor array, a G sensor array and a B sensor array are arranged in this order without gaps therebetween in the vertical direction.

In order to achieve this, in Non-Patent Document 1, an R read-out gate is arranged to the upper side of the R sensor array, and G and B read-out gates are arranged to the lower side of the B sensor array.

However, in Non-Patent Document 1, vertical transfer gates for transferring the pixel signals of the G line sensor to the G and B read-out gates are arranged between the respective B pixels which constitute the B sensor array. Therefore, the light receiving area of each B pixel becomes smaller and the sensitivity of the B pixels declines.

Furthermore, Patent Document 3 discloses a CMOS-type solid-state imaging apparatus which comprises one-dimensional pixel lines in 3 rows of R, G, B which are moved in a vertical direction relatively to an original document, and a read-out circuit which is common to the respective lines and which reads out pixel signals from the respective one-dimensional pixel lines.

However, in Patent Document 3, in order to ensure that the read-out interval of the pixel signals is a prescribed time period or longer, the arrangement pitch P of the one-dimensional pixel lines in the vertical direction is set to satisfy the relationship $P \geq (4/3) \cdot W$ with respect to the width W of the light receiving area of each pixel in the vertical direction. Therefore, in Patent Document 3, there is a prescribed limit on the extent to which the arrangement pitch can be reduced, and consequently there is a problem in that color deviation occurs due to the fluctuations in the scanning speed, as described above.

Patent Document 1: Japanese Patent Application Laid-open No. 2002-142078

Patent Document 2: Japanese Patent Application Laid-open No. H10-51602

Patent Document 3: Japanese Patent Application Laid-open No. 2007-336519

Non-Patent Document 1: SONY CX-PAL (Vol. 65) p. 12-13

SUMMARY OF THE INVENTION

The object of the present invention is to provide an image reader which is capable of preventing color deviation without reducing the sensitivity of the pixels.

The image reader according to one aspect of the present invention is an image reader, comprising: a pixel unit in which one-dimensional pixel lines each having a plurality of pixels arranged in a horizontal direction are arranged in n rows (where n is an integer no less than 2) in a vertical direction which is perpendicular to the horizontal direction; a vertical movement unit which moves the pixel unit at a prescribed scanning speed in the vertical direction relatively to an object to be exposed; a read circuit, which is provided so as to correspond to each column of the pixel unit, is common to the respective columns and reads out pixel signals from the pixels; a vertical scanning circuit which scans the pixel unit in the vertical direction; and a control unit which causes the vertical scanning circuit to cyclically select a one-dimensional pixel line of any one row from the n rows of one-dimensional pixel lines each time a prescribed horizontal read time period elapses, controls the read circuit so as to read out pixel signals of the object that has been exposed by the selected one-dimensional pixel line, and controls the vertical movement unit in such a manner that the scanning speed S satisfies S=P/(H(n+1)) where P is an arrangement pitch in the vertical direction of the one-dimensional pixel lines and H is the horizontal read time period.

BEST MODE FOR CARRYING OUT THE INVENTION

First Embodiment

Figure 1:
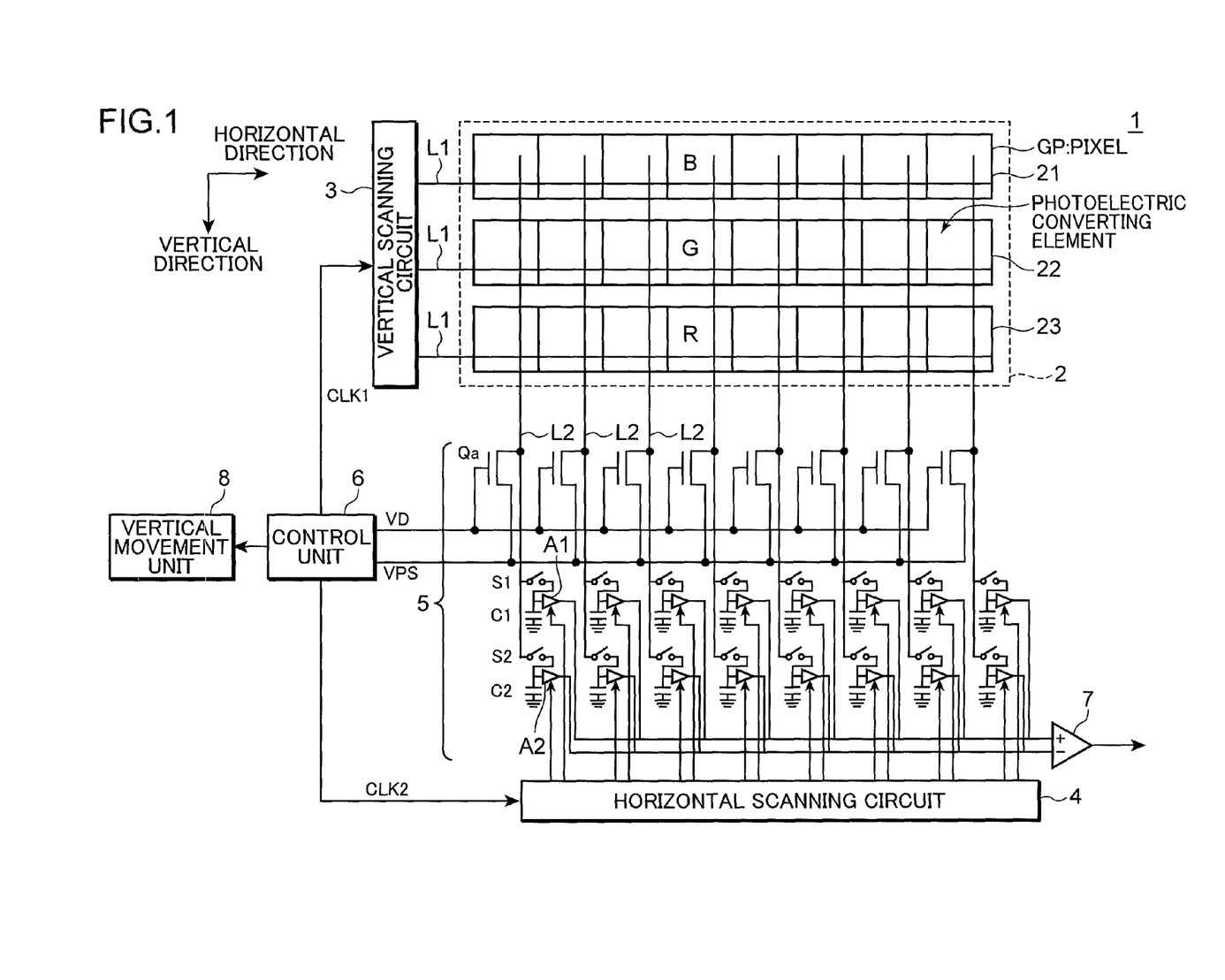
FIG. 1 is a general schematic drawing of an image reader according to a first embodiment of the present invention.

Below, an image reader according to a first embodiment of the present invention will be described with reference to the drawings. FIG. 1 is a general compositional diagram of an image reader 1 according to a first embodiment of the present invention. As shown in FIG. 1, the image reader 1 comprises a pixel unit 2, a vertical scanning circuit 3, a horizontal scanning circuit 4, a read circuit 5, a control unit 6, a differential amplifier 7 and a vertical movement unit 8.

The image reader 1 either scans an object which is moved in a vertical direction with respect to a stationary pixel unit 2, or scans an object by moving the pixel section 2 in a vertical direction with respect to a stationary object. In the present embodiment, an original document, for example, is used as the object.

The elements apart from the control unit 6 in FIG. 1, in other words, the pixel unit 2, the vertical scanning circuit 3, the horizontal scanning circuit 4, the read circuit 5 and the differential amplifier 7, constitute a solid-state imaging unit.

The pixel unit 2 comprises pixel lines 21 to 23 (one-dimensional pixel lines) which are arranged in three rows in a vertical direction, which is perpendicular to the horizontal direction. The pixel lines 21 to 23 each constitute a line sensor in which a plurality of pixels GP are arranged one-dimensionally in the horizontal direction.

Furthermore, the pixel lines 21 to 23 respectively have B (blue), G (green) and R (red) color filters installed on the openings of the pixels GP, and read out B, G, R pixel signals by exposing the object.

The vertical scanning circuit 3 is connected to each of the pixel lines 21 to 23 via a selection signal line L1, and cyclically outputs a row selection signal for selecting the respective rows of the pixel unit 2, to the pixel lines 21 to 23, from the upper side to the lower side or from the lower side to the upper side in the vertical direction, in accordance with a clock signal CLK1 output from the control unit 6, thereby scanning the pixel unit 2 in the vertical direction.

In the present embodiment, the vertical scanning circuit 3 is constituted by a shift register, but it is not limited to this and may also be constituted by a random access circuit. If the vertical scanning circuit 3 is constituted by a shift register, then although the composition is simple, it is possible to select the pixel lines 21 to 23 cyclically in accordance with their arrangement sequence.

Furthermore, if a random access circuit is used as the vertical scanning circuit 3, then it is possible to select the pixel lines 21 to 23 in any desired sequence, regardless of the arrangement sequence of the pixel lines 21 to 23.

The horizontal scanning circuit 4 is constituted by a shift register, for example, and cyclically outputs a column selection signal for selecting the respective columns of the pixel unit 2, to read circuits 5 of the respective columns, in accordance with a clock signal CLK2 which is output from the control unit 6, thereby scanning the respective read circuits 5 from left to right or from right to left, for example, in the horizontal direction.

There are a plurality of vertical signal lines L2 which correspond to each column in the pixel unit 2. Furthermore, the vertical signal lines L2 are respectively connected to the three pixels GP in the corresponding column.

The read circuits 5 are provided so as to correspond to the respective columns of the pixel unit 2, and each read out pixel signals from the respective pixels GP. In other words, a read circuit 5 is provided commonly for the three pixels GP of the corresponding column, and pixel signals are read out from these three pixels GP via a vertical signal line L2.

Here, each read circuit 5 comprises a load transistor Qa, a signal sampler hold switch S1, a noise sample hold switch S2, a signal sample hold capacitor C1, a noise sample hold capacitor C2 and amplifiers A1 and A2.

The load transistor Qa is constituted by a field effect transistor, for example, which functions as a load when a load voltage signal VD is applied to the gate of the transistor under the control of the control unit 6.

The noise sample hold switch S2 switches on and off under the control of the control unit 6 and when switched on, reads out a noise component of a pixel signal from the pixel line selected by the vertical scanning circuit 3, and sample-holds the noise component in the noise sample hold capacitor C2.

The amp A2 outputs the noise component sample-held in the noise sample hold capacitor C2, to the differential amplifier 7, in accordance with a column selection signal output from the horizontal scanning circuit 4.

The signal sample hold switch S1 switches on and off under the control of the control unit 6, and when switched on, reads out the noise component plus the signal component of the pixel signal from the pixel line selected by the vertical scanning circuit 3, and sample-holds the noise component and signal component in the signal sample hold capacitor C1.

The amplifier A1 outputs the noise component plus the signal component sample-held in the signal sample hold capacitor C1, to the differential amplifier 7, in accordance with the column selection signal output from the horizontal scanning circuit 4.

The control unit 6 is constituted by a microcomputer including, for example, a dedicated hardware circuit or a CPU (central processing unit), a ROM (read only memory) and a RAM (random access memory), and the like, and exercises overall control of the image reader 1.

Furthermore, the control unit 6 causes the vertical scanning circuit 3 to cyclically select any one row of the pixel lines, from among the pixel lines 21 to 23 each time a prescribed horizontal read time period (hereinafter, called "H period") elapses, and controls the read circuits 5 and the horizontal scanning circuit 4 so as to read out pixel signals of the object that has been exposed by the selected pixel line.

Furthermore, the control unit 6 controls the vertical movement unit 8 in such a manner that Formula (1), is satisfied, when the arrangement pitch of the pixel lines 21 to 23 in the vertical direction is represented by P and the H period is represented by H:

$$S = P/4H \qquad (1)$$

Here, the control unit 6 causes the vertical scanning circuit 3 to select the pixel lines 21 to 23 cyclically in this sequence, but it may cause the vertical scanning circuit 3 to select the pixel lines cyclically in any desired sequence.

The H period may be variable. In this case, for example, an operating unit which receives an operational instruction from the user is also provided, and the control unit 6 sets the H period in accordance with an operating instruction received by the operating unit. In this case, the control unit 6 changes the H period, for example, by altering the frequency of the clock signal CLK1 and CLK2, or by increasing or decreasing the number of pixels which are the object of reading during one H period.

The differential amplifier 7 finds the differential between the noise component output from the amplifier A2 and the noise component plus signal component output from the amplifier A1, removes the noise component from the pixel signal, and then outputs the signal to an A/D converting section (not illustrated) which is provided in a subsequent stage, for example.

The vertical movement unit 8 moves the pixel unit 2 in the vertical direction relatively to an original document which is an exposure object, at a scanning speed S indicated by Formula (1). In the present embodiment, the vertical movement unit 8 moves the pixel unit 2 vertically with respect to a stationary original document, but the invention is not limited to this and it is also possible to move an original document vertically with respect to a stationary the pixel unit 2.

If the pixel unit 2 is moved vertically with respect to a stationary original document, then the vertical movement unit 8 is composed by using a movement mechanism for moving the pixel unit 2 within a prescribed range of movement in the vertical direction and a motor, and the like, for moving the pixel unit 2 by driving the movement mechanism.

Furthermore, if the original document is moved vertically with respect to a stationary pixel unit 2, then the vertical movement unit 8 is constituted by using a conveyance roller which moves the original document in the vertical direction and a motor, and the like, which drives the conveyance roller.

Figure 2:
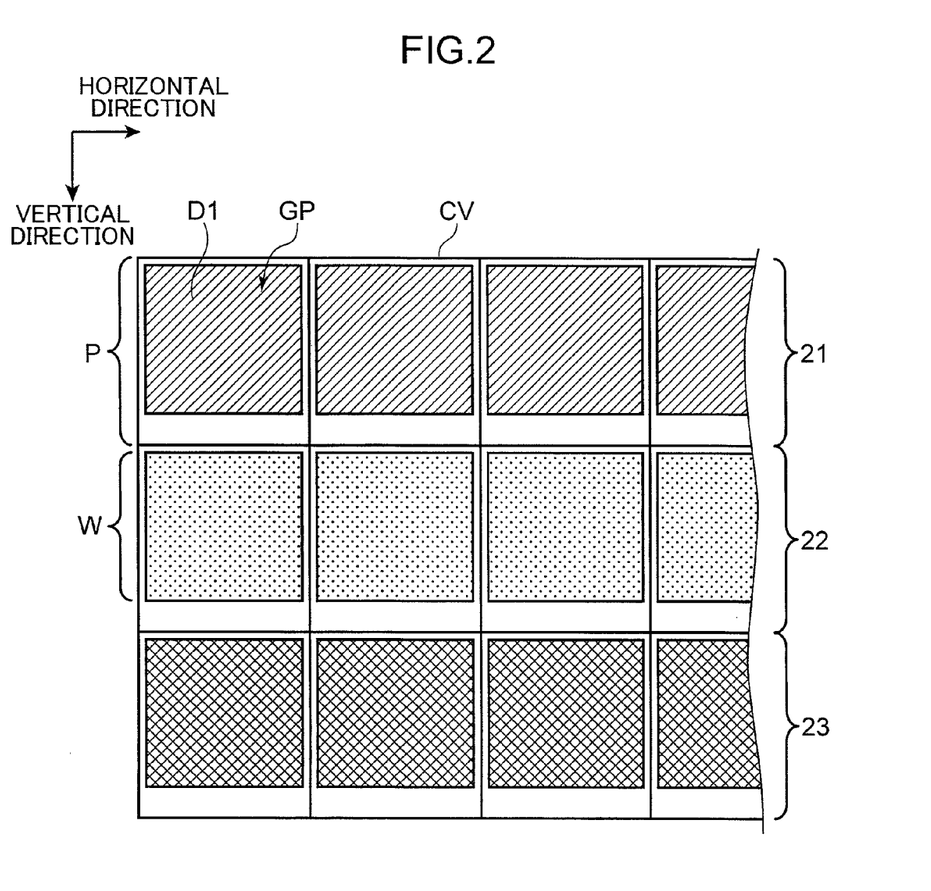
FIG. 2 is a diagram showing a schematic view of an external composition of a pixel unit according to a first embodiment of the present invention.

FIG. 2 is a diagram showing a schematic view of the external composition of the pixel unit 2. As shown in FIG. 2, the pixel lines 21 to 23 each comprise a strip-shaped light shielding layer CV having a lengthwise direction in the horizontal direction.

In the example in FIG. 2, the pixel lines 21 to 23 are arranged without any gaps therebetween in the vertical direction. Therefore, the arrangement pitch P of the pixel lines 21 to 23 is the length in the vertical direction from the upper end to the lower end of the light shielding layer CV of each pixel line.

Furthermore, a strip-shaped light receiving region D1 for guiding light from the object to the photo-electrical converting elements of the respective pixels GP is formed on the main surface of the light shielding layer CV. When the width of the light receiving region D1 from the upper end to the lower end in the vertical direction is represented as W, then the arrangement pitch P satisfies the conditions of Formula (2) below.

$$W \leq P \leq W \cdot (4/3) \qquad (2)$$

When W=P, then the ratio of each pixel GP occupied by the light receiving region D1 becomes a maximum. Furthermore, when P=W·(4/3), then the ratio of each pixel GP occupied by the light receiving region D1 becomes a minimum. Therefore, as the arrangement pitch P increases, the ratio of the pixel GP occupied by the light receiving region D1 becomes a smaller, and as the arrangement pitch P decreases, the ratio of the pixel GP occupied by the light receiving region D1 becomes greater.

The greater the surface area of the light receiving region D1, the greater the number of photons which can be received by the photo-electric converting element, and therefore the higher the sensitivity. Furthermore, as the arrangement pitch P increases, the possibility of color deviation becomes greater, due to the effects of fluctuation in the scanning speed S. Therefore, in Formula (2), the upper limit value of the arrangement pitch P is set to P=(4/3)·W.

In other words, by setting the upper limit value of the arrangement pitch to (4/3)·W, the surface area of the light receiving regions D1 is increased, thus raising the sensitivity, while at the same time the effects of fluctuation in the scanning speed S are reduced and the occurrence of color deviation can be suppressed.

Furthermore, if the arrangement pitch P is less than W, then the respective pixel lines overlap with each other. Therefore, in Formula (2), the lower limit value of the arrangement pitch P is set to W.

Figure 3:
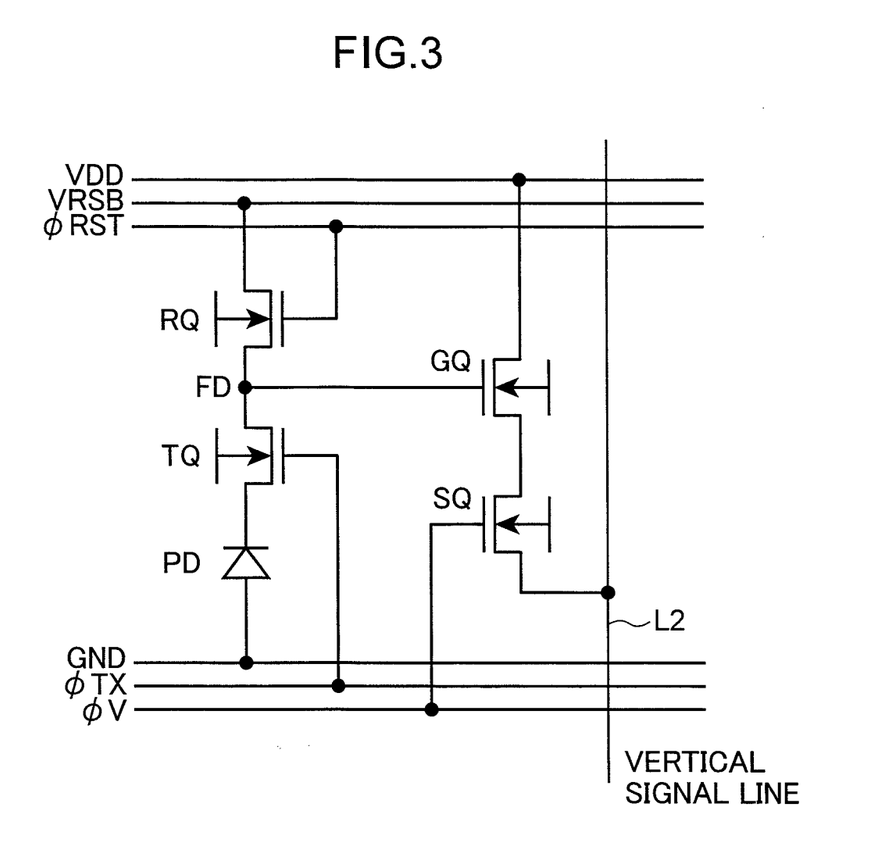
FIG. 3 shows a circuit diagram of a pixel circuit which constitutes the respective pixels.

FIG. 3 shows a circuit diagram of a pixel circuit which constitutes each pixel GP. As shown in FIG. 3, the pixel circuit is constituted by a CMOS pixel circuit comprising a photo-electric converting element PD, a transfer transistor TQ, a reset transistor RQ, an amplifier transistor GQ, and a row selection transistor SQ.

The photoelectric converting element PD receives light from the object and accumulates signal charge corresponding to the amount of light received. Here, the anode of the photoelectric converting element PD is grounded and the cathode is connected to the source of the transfer transistor TQ.

The transfer transistor TQ transfers the signal charge accumulated by the photoelectric converting element PD to a floating diffusion (hereinafter, abbreviated as "FD"). A transfer signal φTX is input to the gate of the transfer transistor TQ, which is switched on and off by the transfer signal φTX. The drain of the transfer transistor TQ is connected to the FD. Here, the transfer signal φTX is output from the control unit 6, for example.

The FD stores the signal charge transferred from the photoelectric converting element PD and outputs a voltage signal having a level corresponding to the quantity of the accumulated signal charge, as a pixel signal.

In the reset transistor RQ, φRST, which is a signal for switching the reset transistor RQ on and off, is input to the gate, VRSB, which is a drive voltage, is input to the source, and the drain is connected to the gate of the amplifier transistor GQ via the FD.

The reset transistor RQ switches on and off under the control of the control unit 6 and resets the FD. The VRSB is output from a voltage source (not illustrated) and φRST is output from the control unit 6, for example.

In the amplification transistor GQ, the gate is connected to the transfer transistor TQ and the reset transistor RQ via the FD, a drive voltage, VDD, is input to the source, and the drain is connected to the row selection transistor SQ. The amplification transistor GQ amplifies the pixel signal output from the FD and outputs the pixel signal to the row selection transistor SQ. VDD is output from a power source (not illustrated), for example.

In the row selection transistor SQ, a row selection signal φV is input to the gate, the source is connected to the amplification transistor GQ, and the drain is connected to the read circuit 5 via the vertical signal line L2. The row selection transistor SQ outputs the pixel signal which has been amplified by the amplification transistor GQ, to the read circuit 5 via the vertical signal line L2. Here, φV is output from the vertical scanning circuit 3 via the row selection signal line L1, for example.

Figure 4A:
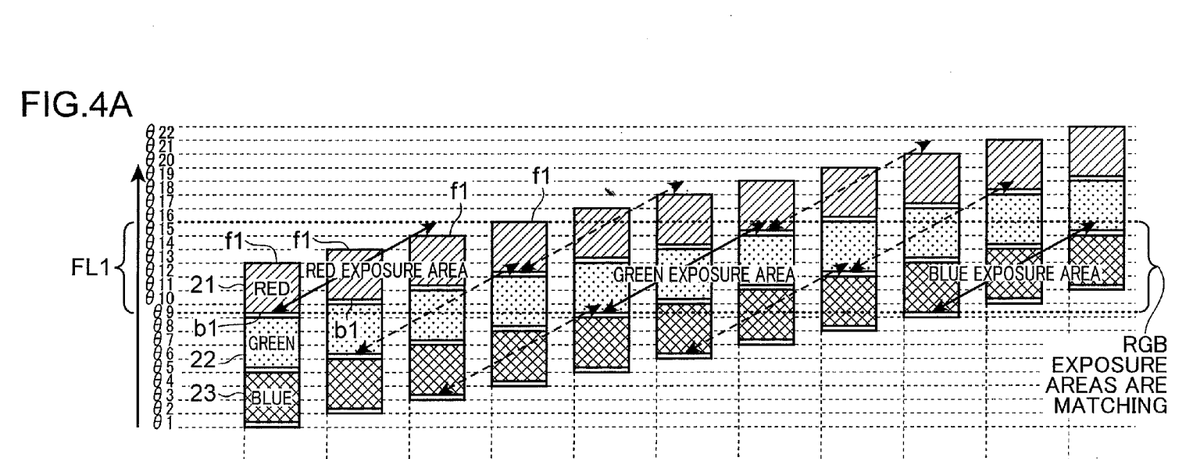
FIG. 4A is a schematic drawing showing the relationship between the positions of the pixel lines and an original document when a pixel unit is moved from the lower side to the upper side in the vertical direction, with respect to an original document.

FIG. 4A is a schematic drawing showing the relationship between the position of the pixel lines 21 to 23 and the original document when the pixel unit 2 is moved from the lower side toward the upper side in the vertical direction with respect to the original document. In FIG. 4A, the vertical axis indicates the position of the pixel lines 21 to 23 in the vertical direction and the horizontal axis indicates time. Furthermore, in FIG. 4A, one square shape represents one pixel line. Moreover, the non-white region of each square shape indicates the light receiving region D1 shown in FIG. 2.

Figure 4B:
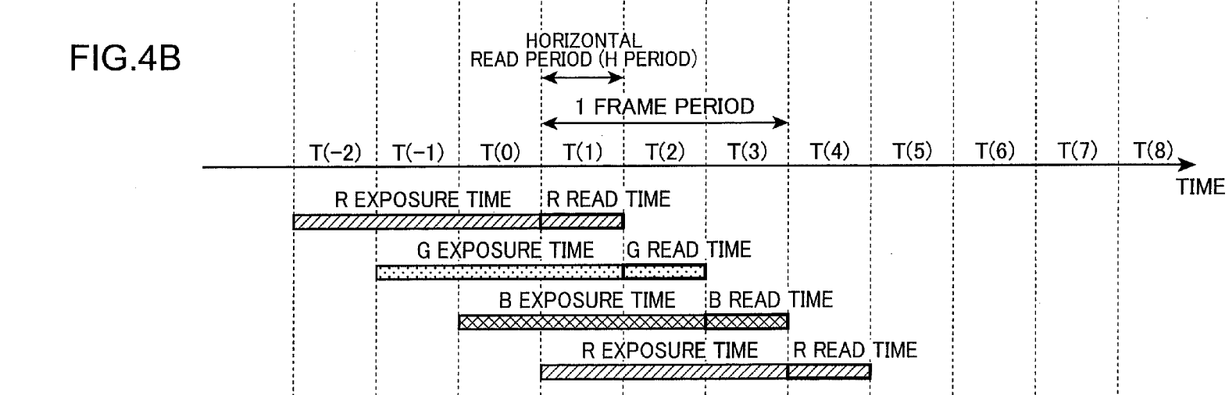
FIG. 4B is a timing chart showing an exposure time period and a read time period of each pixel line, when the pixel lines are moved as shown in FIG. 4A.

FIG. 4B is a timing chart showing the exposure time period and the read time period of each pixel line, when the pixel lines 21 to 23 are moved as shown in FIG. 4A. Furthermore, in FIGS. 4A and 4B, one division indicated by the dotted lines on the time axis indicates an H period. Moreover, in FIG. 4A, one division indicated by the dotted lines on the vertical axis indicates the movement distance of the pixel lines 21 to 23 during one H period. Furthermore, three H periods constitute one frame period. Moreover, a region of the original document which is exposed by one pixel line in one frame period is called a frame.

Firstly, the R pixel line 21 is considered. In the period T(−2), the front end f1 of the pixel line 21 is moved from the rear end to the front end of the line θ13, and the pixel line 21 exposes a portion of line θ9 to line θ13.

Here, at the start time of the period T(−2), the rear end b1 of the light receiving region D1 of the pixel line 21 is positioned slightly above the rear end of the line θ9. Therefore, in period T(−2), the pixel line 21 is not able to expose the whole region of the line θ9. Consequently, the portion of the line θ9 means a region from the position of the rear end b1 of the light receiving region D1 of the pixel line 21 at the start time of the period T(−2) to the front end of the line θ9. Below, a portion of line θi (where i is an index indicating a line) is defined in accordance with the portion of the line θ9 described above.

In the period T(−1), the front end f1 of the pixel line 21 is moved from the rear end to the front end of the line θ14, and the pixel line 21 exposes from a portion of line θ10 to line θ14.

In the period T(0), the front end f1 of the pixel line 21 is moved from the rear end to the front end of the line θ15, and the pixel line 21 exposes from a portion of line θ11 to line θ15.

In the period T(1), the read circuits 5 read out, from the pixel line 21, R pixel signals for frame FL1 which consists of a region from a portion of line θ9 to line θ15 that has been exposed by the pixel line 21 during three H periods from period T(−2) to period T(0).

In the period T(1), the read circuits 5 read out pixel signals from the pixel line 21, but simultaneously with this, the pixel line 21 exposes from a portion of the line θ12 to the line θ16.

In period T(2) to period T(3), the pixel line 21 exposes from a portion of line θ13 to line θ18.

In period T(4), the read circuits 5 read out pixel signals from a portion of line θ12 to line θ18 which is exposed from the pixel line 21 in three H periods from period T(1) to period T(3). Furthermore, in the period T(4), the pixel line 21 exposes from one portion of line θ15 to line θ19.

Thereafter, the pixel line 21 and the read circuits 5 repeat the aforementioned operation. In other words, the read circuits 5 read out pixel signals of the lines exposed by the pixel line 21 during three H periods each time three H periods have elapsed.

Next, the G pixel line 22 is considered. In the three H periods from period T(−1) to period T(1), the pixel line 22 exposes from a portion of line θ6 to line θ12.

In the period T(2), the read circuits 5 read out pixel signals from one portion of line θ6 to line θ12, which is exposed by the pixel line 22 in three H periods from period T(−1) to period T(1). Furthermore, in the period T(2), the pixel line 22 exposes line θ9 to line θ13.

Thereafter, the read circuits 5 read out pixel signals of the lines exposed by the pixel line 22 during three H periods each time three H periods have elapsed.

Here, the G read time period is set as the next H period following the R read time period. Therefore, the period T(5) is the next G read time period. In the period T(5), the read circuits 5 read out a frame FL1 exposed by the pixel line 22 in the three H periods from period T(2) to period T(4).

As described above, the read circuits 5 read out R pixel signals for the frame FL1 in period T(1). Consequently, the G pixel signals read out by the read circuits 5 are pixel signals of the same region as the R pixel signals.

The read time periods for R, G and B are assigned independently to respective H periods in this way because the read circuits 5 are shared by the R, G and B pixels GP, and therefore it is not possible to read out pixel signals of different colors simultaneously.

Next, the B pixel line 23 is considered. The B read time period is set to the next H period after the G read time period. Furthermore, the read circuits 5 read out pixel signals of the lines exposed by the pixel line 23 in three H periods each time three H periods have elapsed.

Consequently, the B read time periods are period T(3), period T(6) and period T(9). The period T(9) is not shown in the drawings.

In time period T(9), the read circuits 5 read out a frame FL1 which has been exposed by the pixel line 23 in the three H periods from period T(6) to period T(8).

As described above, the read circuits 5 read out R pixel signals for the frame FL1 in period T(1). Moreover, as described above, the read circuits 5 read out G pixel signals for frame FL1 in period T(5).

Consequently, the B pixel signals read out by the read circuits 5 are pixel signals of the same region as the G pixel signals and the B pixel signals.

In this way, the scanning speed S is set as shown in Formula (1) described above, and the respective H periods are assigned cyclically as read time periods for the R, G, B pixel signals; the R, G, B pixel signals for the region exposed in three H periods are read out by the read circuits 5 each time three H periods have elapsed. Therefore, the R, G, B pixel signals read out by the read circuits 5 are pixel signals for the same region and color deviation is prevented.

Since the R, G, B read time periods are set as shown in FIGS. 4A and 4B, then it can be readily inferred that the read circuits 5 can read out R, G, B pixel signals for the same frame, similarly to frame FL1, in respect of other frames apart from the frame FL1.

Figure 5A:
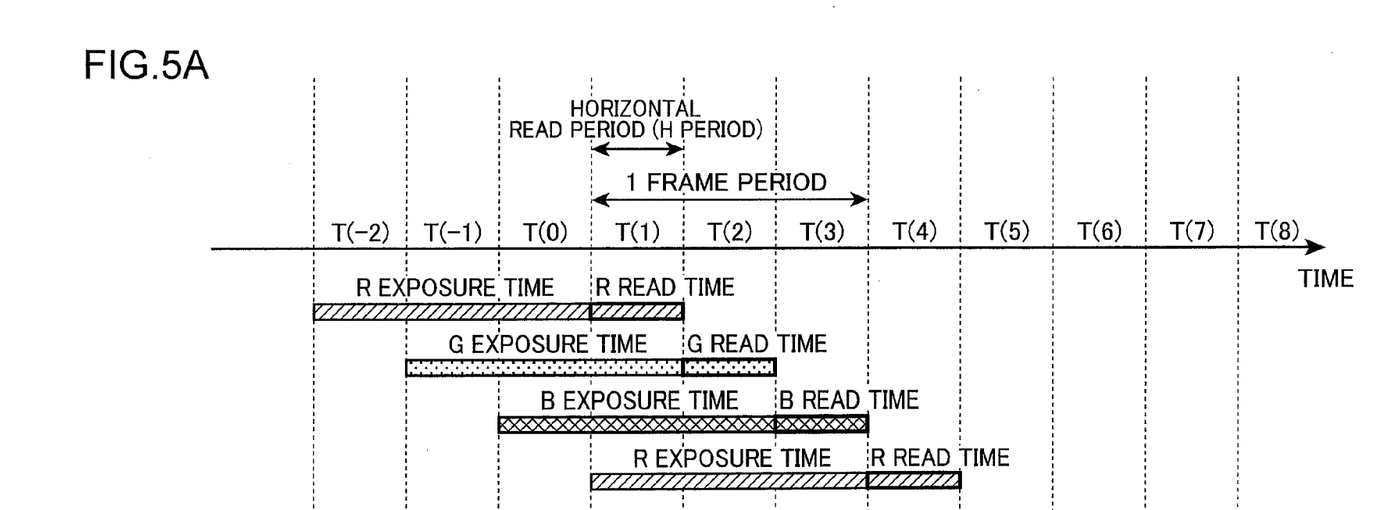
FIG. 5A is the same diagram as FIG. 4B.
Figure 5B:
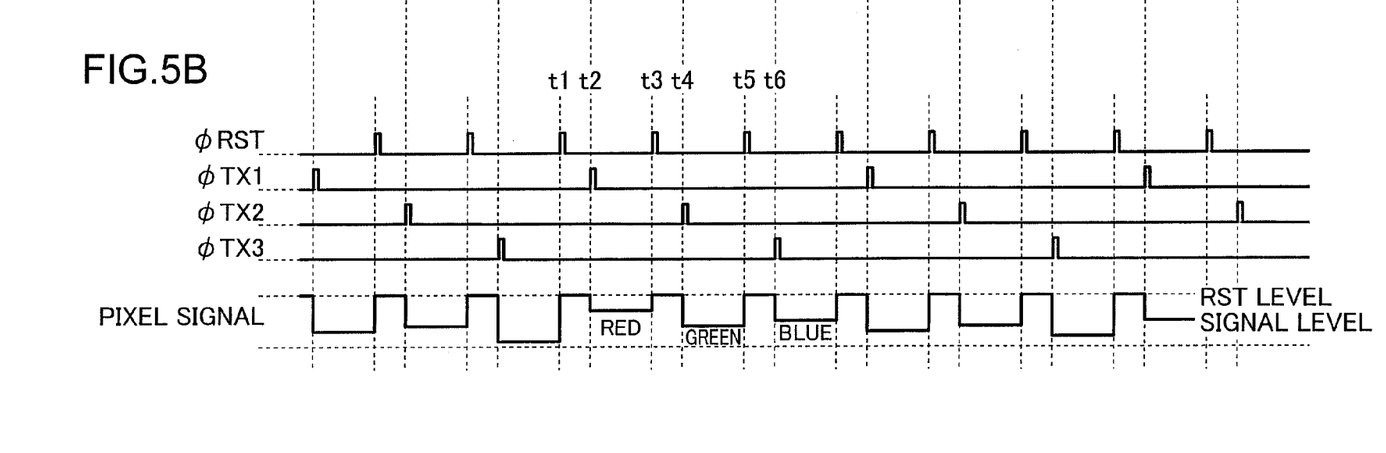
FIG. 5B is a timing chart showing the operation of an image reader.

FIG. 5A is a diagram which is the same as FIG. 4B, and FIG. 5B is a timing chart showing the operation of the image reading apparatus 1. Below, the operation of the image reader 1 is described with reference to FIG. 5. φTX1 in FIG. 5B indicates the transfer signal φTX which is input to the transfer transistor TQ of the R pixel circuit, φTX2 indicates the transfer signal φTX which is input to the transfer transistor TQ of the G pixel circuit, and φTX3 indicates the transfer signal φTX which is input to the transfer transistor TQ of the B pixel circuit. Furthermore, the pixel signals in FIG. 5B shows the voltage level of pixel signals flowing in a vertical signal line L2.

At a time t1 slightly before the start time of period T(1), φRST becomes high level (called "Hi" below) for a prescribed period of time, the reset transistor RQ switches on and off, the FD is reset and a pixel signal of a reset level (hereinafter, called "RST level") is output from the vertical signal line L2. The read circuit 5 reads out the pixel signal as a noise component and sample-holds the signal in the noise sample hold capacitor C2.

At time t2 which is the start time of period T(1), φTX1 becomes Hi for a prescribed period of time, the transfer transistor TQ switches on, and the R signal charge accumulated by the photoelectric converting element PD is transferred to the FD.

Consequently, a pixel signal having a level which is reduced in accordance with the signal charge exposed during the R exposure period, from the RST level, is output from the vertical signal line L2. The read circuit 5 then reads out this pixel signal as a noise component plus a signal component, and sample-holds this signal in the signal sample hold capacitor C1. By means of the foregoing, an R pixel signal which has been exposed during an R exposure period from period T(−2) to period T(0) is read out in period T(1).

Similarly to the R pixel signal, in the case of the G pixel signal also, φRST becomes Hi for a prescribed period of time at time t3, FD is reset, and the noise component is read out. Furthermore, at time t4, φTX2 becomes Hi for a prescribed period of time, and a noise component plus a signal component of the G pixel signal which was exposed during a G exposure period from period T(−1) to period T(1) is read out in period T(2).

Similarly to the R pixel signal, in the case of the B pixel signal also, φRST becomes Hi for a prescribed period of time at time t5, FD is reset, and the noise component is read out. Furthermore, at time t6, φTX3 becomes Hi for a prescribed period of time, and a noise component plus a signal component of the B pixel signal which was exposed during a B exposure period from period T(0) to period T(2) is read out in period T(3).

As can be seen from FIG. 5B, the period from when φTX1 becomes Hi until when φTX2 becomes Hi, is the R read period, and the period from when φTX2 becomes Hi until when φTX3 becomes Hi, is the G read period, and the period from when φTX3 becomes Hi until when φTX1 becomes Hi, is the B read period. Consequently, the cycles of φTX1 to φTX3 are each three H periods long.

In this way, according to the image reader 1 of the present embodiment, the pixel line of any one row, from among the three rows of pixel lines 21 to 23, is selected cyclically each time an H period elapses, and pixel signals of the object which has been exposed by the selected pixel line are read out by the read circuits 5 which are provided so as to correspond to the respective columns of the pixel unit 2 and are common to the respective columns.

The relative scanning speed S of the pixel unit 2 with respect to the object is set on the basis of Formula (1) stated above. By this means, the pixel lines 21 to 23 respectively expose the same line on the object, and hence color deviation can be prevented.

Furthermore, if the scanning speed S satisfies Formula (1), it is possible to cause the respective pixel lines 21 to 23 to expose the same line on the object respectively, regardless of the arrangement pitch P of pixel lines in the vertical direction. As a result of this, it is possible to reduce the arrangement pitch P and to suppress the occurrence of color deviation caused by the effects of fluctuation in the scanning speed S.

Moreover, the light receiving region D1 of each pixel GP can be increased in accordance with the reduction in the arrangement pitch P, and hence the sensitivity of each pixel GP can be increased. Furthermore, since the light receiving region D1 of each pixel GP can be increased, then it is possible to maintain a certain sensitivity or higher, even if the scanning speed S is raised. Moreover, it is also possible to reduce the arrangement pitch P and to make the apparatus compact in size.

Second Embodiment

Figure 6:
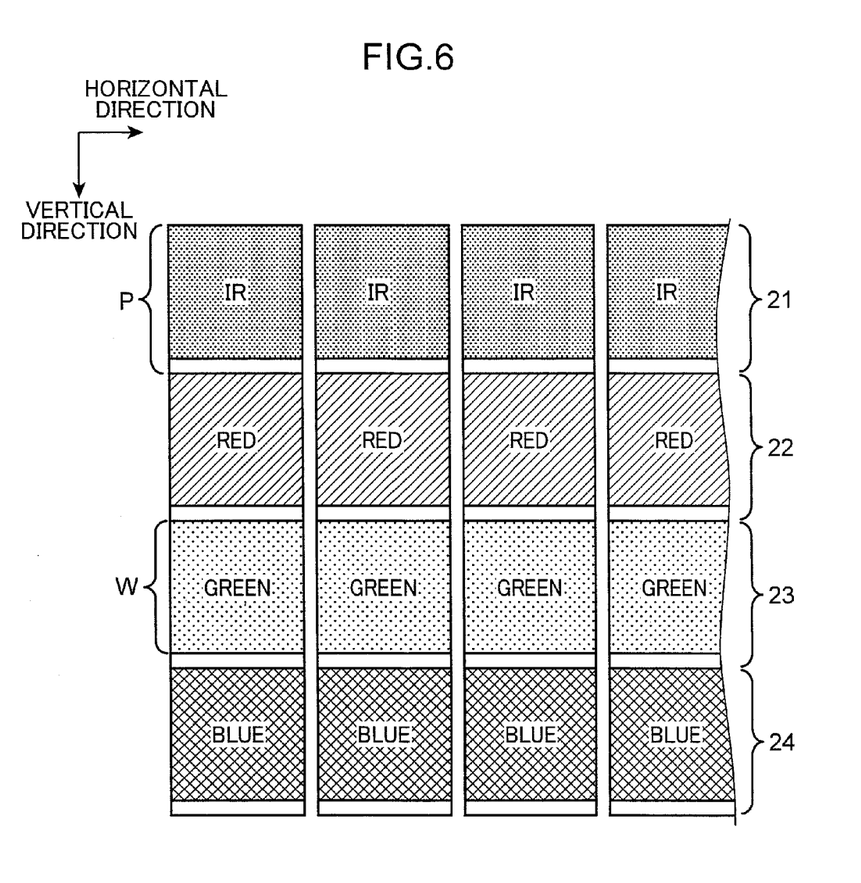
FIG. 6 is a diagram showing a schematic view of an external composition of a pixel unit according to the second embodiment of the present invention.

Next, the image reader 1 according to the second embodiment will be described. The characteristic feature of the image reader 1 according to the second embodiment is that pixel lines are arranged in four rows in the vertical direction. FIG. 6 is a diagram showing a schematic view of the external composition of the pixel unit 2 according to the second embodiment of the present invention.

As shown in FIG. 6, in the present embodiment, the pixel unit 2 comprises four pixel lines, namely, pixel line 21 to pixel line 24, sequentially from the upper side in the vertical direction. In the present embodiment, description of elements which are the same as the first embodiment is omitted.

In the present embodiment, the control unit 6 shown in FIG. 1 causes the vertical scanning circuit 3 to cyclically select a pixel line of any one row of the pixel lines 21 to 24 each time one H period elapses, and controls the read circuits 5 and the horizontal scanning circuit 4 so as to read out pixel signals of the object which has been exposed by the selected pixel line.

Furthermore, the control unit 6 controls the vertical movement unit 8 in such a manner that the scanning speed S satisfies Formula (3).

$$S = P/5H \qquad (3)$$

Furthermore, the arrangement pitch P satisfies the condition of Formula (4).

$$W \leq P \leq W \cdot (5/4) \qquad (4)$$

Here, the control unit 6 causes the vertical scanning circuit 3 to select the pixel lines 21 to 24 cyclically in this sequence, but may also cause the vertical scanning circuit 3 to select the pixel lines 21 to 24 cyclically in any desired sequence.

Figure 7:
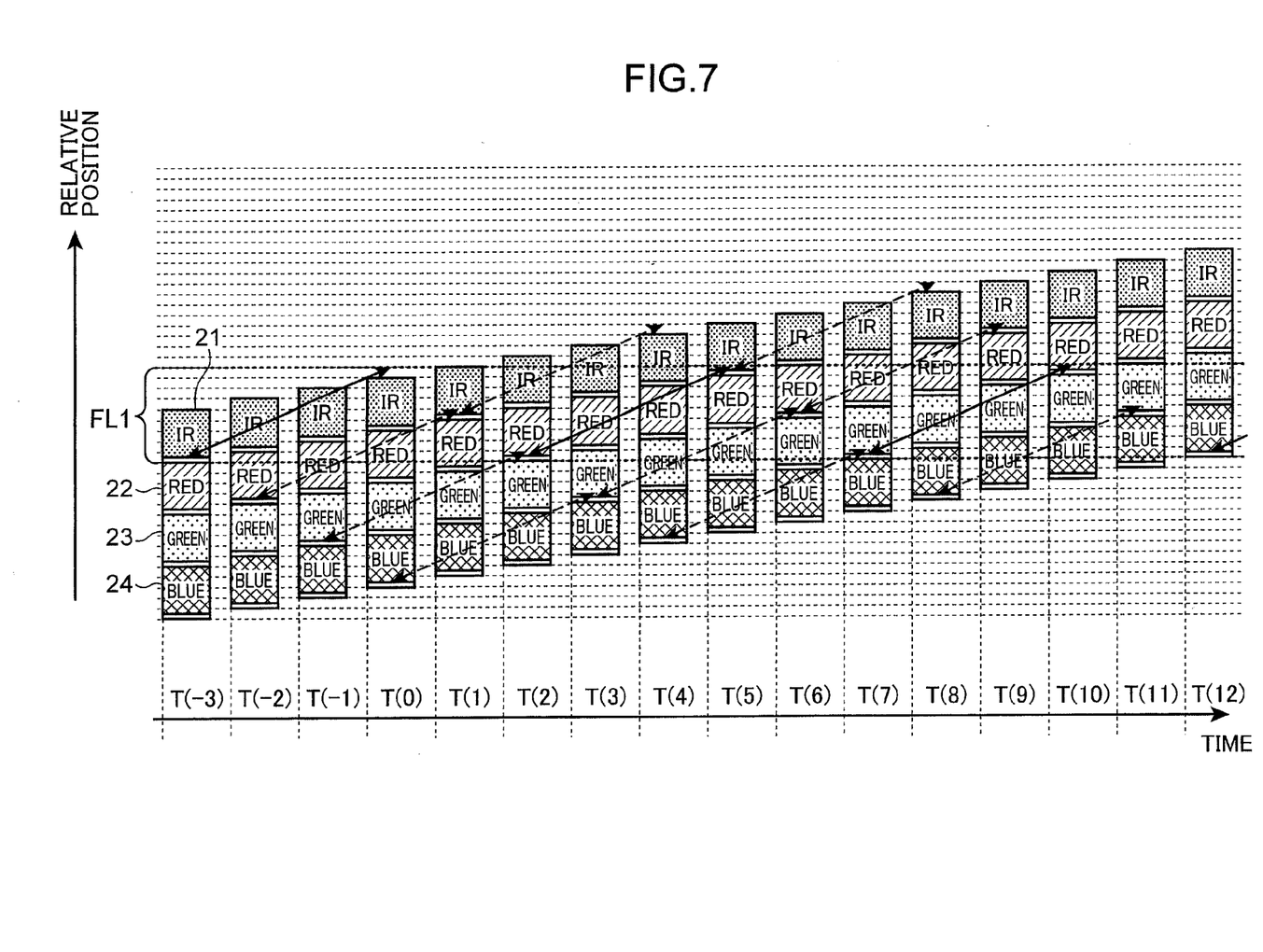
FIG. 7 is a schematic drawing showing a relationship between the positions of the respective pixel lines and an original document when the pixel unit is moved from the lower side to the upper side in the vertical direction, with respect to the original document, in an image reader according to a second embodiment of the present invention.

FIG. 7 is a schematic diagram showing the relationship between the positions of the pixel lines 21 to 24 and the original document when the pixel unit 2 is moved from the lower side to the upper side in the vertical direction with respect to an original document, in an image reader 1 according to the second embodiment of the present invention.

The pixel line 21 is constituted by pixels GP which perform exposure with infrared light (IR). The pixel lines 22 to 24 are each constituted by pixels GP which perform exposure with R, G and B light.

In the present embodiment, each H period is assigned cyclically as a read period for IR, R, G, B pixel signals, and the IR, R, G, B pixel signals for the region exposed during four H periods are read out by the read circuits 5 each time four H periods have elapsed.

In the example in FIG. 7, in period T(1), the read circuits 5 read out the pixel signals for the frame FL1 which has been exposed by the pixel line 21 in the four H periods from period T(−3) to T(0).

Furthermore, in period T(6), the read circuits 5 read out the pixel signals for the frame FL1 which has been exposed by the pixel line 22 in the four H periods from period T(2) to T(5).

Moreover, in period T(11), the read circuits 5 read out the pixel signals for the frame FL1 which has been exposed by the pixel line 23 in the four H periods from period T(7) to T(10).

Furthermore, in period T(16) which is not shown in the drawings, the read circuits 5 read out the pixel signals for the frame FL1 which has been exposed by the pixel line 24 in the four H periods from period T(12) to T(15).

In other words, the IR, R, G, B pixel signals in frame FL1 are respectively read out in period T(1), period T(6), period T(11) and period T(16).

Therefore, the IR, R, G, B pixel signals read out by the read circuits 5 are pixel signals of the same regions, thereby preventing color deviation.

As shown in FIG. 7, since the IR, R, G, B read periods are established, then it can readily be inferred that the read circuits 5 can read out IR, R, G, B pixel signals for the same frame, similarly to frame FL1, in respect of other frames apart from frame FL1.

In this way, according to the image reader 1 of the present embodiment, even if pixel lines are arranged in four rows in the vertical direction, the IR, R, G, B pixel signals read out by the read circuits 5 are of the same frame, and color deviation can be prevented.

Third Embodiment

Next, an image reader 1 according to the third embodiment will be described. The image reader 1 according to the third embodiment provides a generalized version of the content of the first and second embodiments, and comprises pixel lines arranged in n rows (where n is an integer no less than 2) in the vertical direction. In the present embodiment, elements which are the same as the first and second embodiments are omitted from the description. Furthermore, in the present embodiment, the n rows of pixel lines are represented as pixel lines 21 to 2n, in sequence from the upper side in the vertical direction.

In the present embodiment, the control unit 6 shown in FIG. 1 causes the vertical scanning circuit 3 to cyclically select the pixel line of any one row from the pixel lines 21 to 2n each time an H period elapses, and controls the read circuits 5 and the horizontal scanning circuit 4 to read out pixel signals of the object which has been exposed by the selected pixel line.

Here, the control unit 6 may cause the vertical scanning circuit 3 to cyclically select the pixel lines 21 to 2n, in this sequence, or may cause the vertical scanning circuit 3 to cyclically select the pixel lines 21 to 2n in any desired sequence.

The control unit 6 controls the vertical movement unit 8 in such a manner that the scanning speed S satisfies Formula (5).

$$S=P/(H\cdot(n+1)) \quad (5)$$

Furthermore, the arrangement pitch P satisfies the condition in Formula (6).

$$W \leq P \leq W\cdot((n+1)/n) \quad (6)$$

Further explanation of Formula (5) is given here. The distance d through which the pixel line moves in one H period is $d=S\cdot H$. Furthermore, the distance F through which the pixel line moves during one frame, which is three H periods, is $F=n\cdot S\cdot H$. Consequently, in order to cause the pixel lines 21 to 2n to expose the same line on the object, the arrangement pitch P should be set to $P=d+F$. From this, $P=S\cdot H(n+1)$ is obtained, and hence Formula (5) is obtained.

In this way, according to the image reader 1 of the present embodiment, even if the pixel lines are arranged in n rows in the vertical direction, the pixel lines 21 to 2n can expose the same frame and color deviation can be prevented.

Fourth Embodiment

Figure 8:
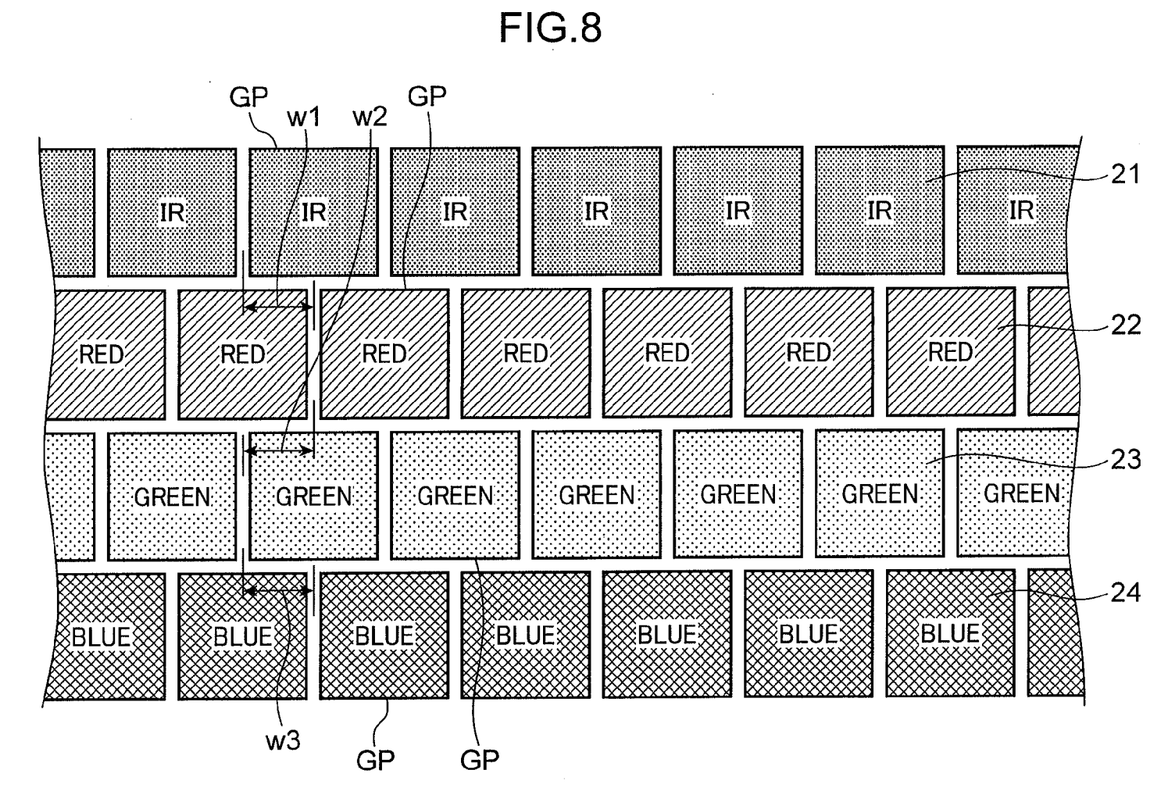
FIG. 8 is a schematic drawing showing an external composition of a pixel unit according to a fourth embodiment of the present invention.

Next, the image reader 1 according to a fourth embodiment of the present invention is described. The image reader 1 according to the fourth embodiment is the image reader 1 according to the second embodiment, characterized in that the pixel lines 21 to 24 are staggered in the horizontal direction and the pixels GP are arranged in a staggered fashion. In the present embodiment, elements which are the same as the first to third embodiments are omitted from the description.

FIG. 8 is a schematic diagram showing an external composition of a pixel unit 2 in the fourth embodiment according to the present invention. As shown in FIG. 8, the pixel line 22 is arranged in such a manner that the pixels GP thereof are shifted by a width w1 in the horizontal direction with respect to the pixels GP of the pixel row 21.

Furthermore, the pixel line 23 is arranged in such a manner that the pixels GP thereof are shifted by a width w2 in the horizontal direction with respect to the pixels GP of the pixel line 22.

Moreover, the pixel line 24 is arranged in such a manner that the pixels GP thereof are shifted by a width w3 in the horizontal direction with respect to the pixels GP of the pixel line 23.

Here, it is possible to set the widths w1 to w3 to a size of ½ of the arrangement pitch, or a size other than ½ of the arrangement pitch, of the pixels GP in the horizontal direction, for example. Furthermore, it is possible to set respectively different sizes, or the same size, for w1 to w3.

Even if the pixel lines 21 to 24 are staggered in the horizontal direction as shown in FIG. 8, then similarly to the second embodiment, by setting the scanning speed S and cyclically assigning the read time of the pixel signals from the pixel lines 21 to 24 each time one H period elapses, then it is possible to cause the pixel lines 21 to 24 to expose the same frame.

In this way, according to the image reader 1 of the present embodiment, since the pixel lines 21 to 24 are arranged in staggered fashion in the horizontal direction, then it is possible to compose the pixel unit 2 in a pseudo honeycomb structure and hence it is possible to increase the horizontal resolution, in addition to the beneficial effects of the first to third embodiments.

Fifth Embodiment

Figure 9:
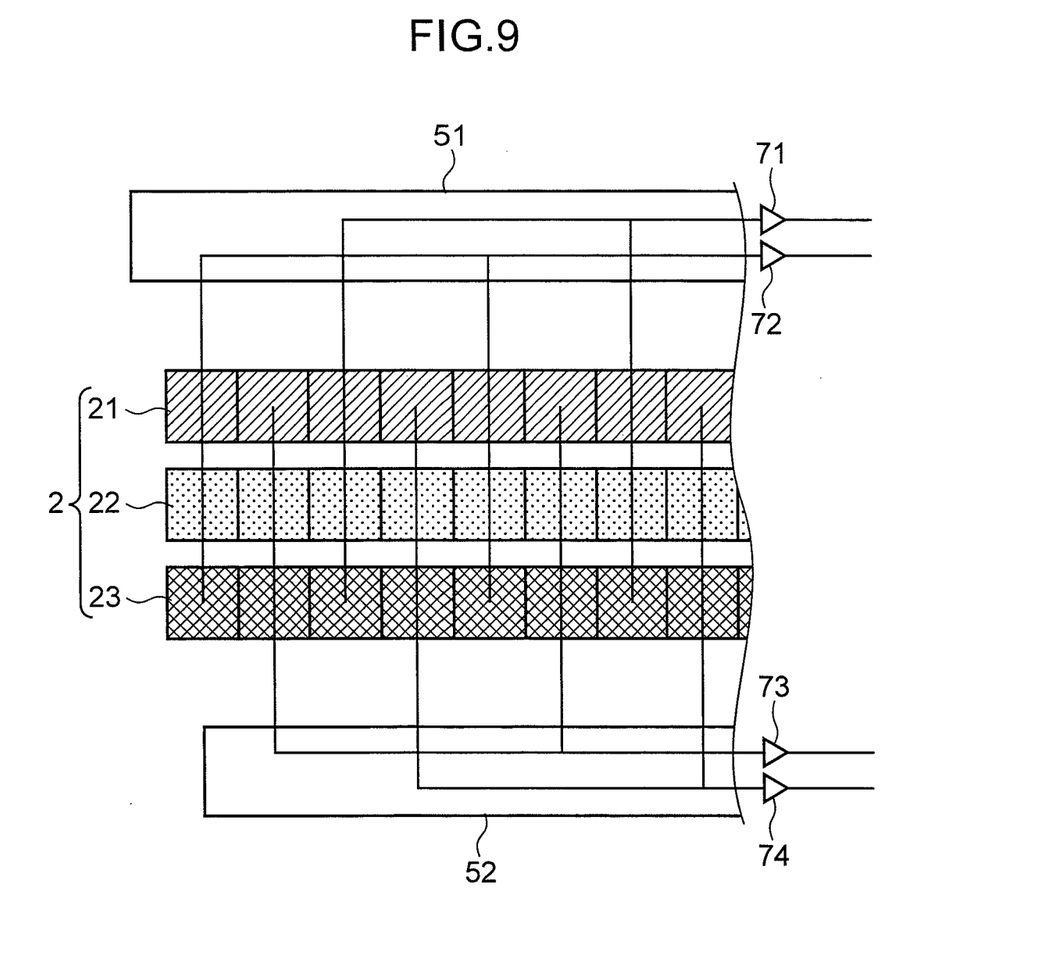
FIG. 9 is a schematic drawing of a pixel unit and a read circuit of an image reader according to a fifth embodiment of the present invention.

Next, an image reader 1 according to a fifth embodiment of the present invention will be described. FIG. 9 is a schematic drawing of a pixel unit 2 and read circuits 5 of an image reader 1 according to a fifth embodiment.

The image reader 1 according to the fifth embodiment is the image reader 1 according to the first embodiment, characterized in that the read circuit 5 is divided into two blocks 51 and 52, the block 51 being arranged to the upper side of the pixel line 21 in the vertical direction and the block 52 being arranged to the lower side of the pixel line 23 in the vertical direction.

The block 51 comprises read circuits 5 corresponding to the odd-numbered columns of the pixel unit 2. Furthermore, the block 52 comprises read circuits 5 corresponding to the even-numbered columns of the pixel unit 2.

In the block 51, the odd-numbered read circuits 5 from the left in the horizontal direction are connected to an amplifier 72, and the even-numbered read circuits 5 are connected to the amplifier 71.

In the block 52, the odd-numbered read circuits 5 from the left in the horizontal direction are connected to the amplifier 73, and the even-numbered read circuits 5 are connected to the amplifier 74.

The image reader 1 composed in this way operates as described below. Firstly, when a pixel line has been selected by the vertical scanning circuit 3, then the read circuits 5 of the block 51 read out the pixel signals exposed by the pixels GP of the corresponding odd-numbered columns.

Simultaneously with this, the read circuits 5 of the block 52 read out the pixel signals exposed by the pixels GP of the corresponding even-numbered columns.

Next, the blocks 51 and 52 output the read pixel signals to the amplifiers 71 to 74. In this case, the block 51 outputs a pixel signal of the pixels GP of the first column to the amplifier 71, and simultaneously with this, outputs a pixel signal of the third column to the amplifier 72.

Furthermore, the block 52 outputs a pixel signal of the pixels GP of the second column to the amplifier 73, and simultaneously with this, outputs a pixel signal of the fourth column to the amplifier 74.

Moreover, simultaneously with the block 51 outputting the pixel signals of the pixels GP of the first column and the pixels GP of the third column, to the amplifiers 71 and 72, the block 52 outputs the pixel signals of the pixels GP of the second column and the pixels GP of the fourth column, to the amplifiers 73 and 74.

Accordingly, the time taken for the read circuits 5 to output the pixel signals for one row is ¼ of the conventional time, and high-speed reading of the pixel signals becomes possible.

The image reader 1 according to the present invention may adopt the modes described below.

In the present embodiment, a 4T-type pixel circuit comprising a transfer transistor TQ is employed as a pixel circuit, as shown in FIG. 3, but the invention is not limited to this, and it is also possible to adopt a 3T-type pixel circuit which does not include a transfer transistor TQ.

Moreover, in the embodiment described above, the size of W, which is the width from the upper end to the lower end of the light receiving region D1 in the vertical direction, can be set to the same size as the size of the photoelectric converting element PD.

Furthermore, in the first embodiment, the pixel lines 21 to 23 respectively form R, G, B pixel lines, but the invention is not limited to this. For example, the pixel lines 21 to 23 may be constituted by pixel lines consisting of pixels which are of the same color but have sensitivity to different wavelength regions. Moreover, in the second embodiment, the pixel lines 21 to 24 may be constituted by pixel lines which are different to IR, R, G, B. In this case also, similarly to a case where there are three pixel lines, the pixel lines 21 to 24 may be constituted by pixel lines which are of the same color but have sensitivity to different wavelength regions.

The technical characteristics of the image reader described above can be summarized as follows.

(1) The image reader described above comprises: a pixel unit in which one-dimensional pixel lines each having a plurality of pixels arranged in a horizontal direction are arranged in n rows (where n is an integer no less than 2) in a vertical direction which is perpendicular to the horizontal direction; a vertical movement unit which moves the pixel unit at a prescribed scanning speed in the vertical direction relatively to an object to be exposed; a read circuit, which is provided so as to correspond to each column of the pixel unit, is common to the respective columns and reads out pixel signals from the pixels; a vertical scanning circuit which scans the pixel unit in the vertical direction; and a control unit which causes the vertical scanning circuit to cyclically select a one-dimensional pixel line of any one row from the n rows of one-dimensional pixel lines each time a prescribed horizontal read time period elapses, controls the read circuit so as to read out pixel signals of the object that has been exposed by the selected one-dimensional pixel line, and controls the vertical movement unit in such a manner that the scanning speed S satisfies S=P/(H(n+1)), where P is an arrangement pitch in the vertical direction of the one-dimensional pixel lines and H is the horizontal read time period.

According to this composition, the one-dimensional pixel line of any one row of the n rows of one-dimensional pixel lines is selected cyclically each time a horizontal read time period elapses, and pixel signals of the object which has been exposed by the selected one-dimensional pixel line are read out by a read circuit which is provided so as to correspond to each column of the pixel unit and is common to the respective columns.

The relative scanning speed S of the pixel unit with respect to the object is set to be S=P/(H(n+1)), when the arrangement pitch in the vertical direction of the one-dimensional pixel lines is represented as P and the horizontal read time period is represented as H. Consequently, each one-dimensional pixel line exposes the same line of the object and color deviation can be prevented.

Furthermore, provided that the scanning speed S satisfies the aforementioned formula, then it is possible to cause the one-dimensional pixel lines to expose the same line of the object, regardless of the arrangement pitch of the one-dimensional pixel lines in the vertical direction. As a result of this, it is possible to reduce the arrangement pitch of the one-dimensional pixel lines, and the occurrence of color deviation due to the effects of fluctuations in the scanning speed can be suppressed.

Moreover, if the horizontal read time can be shortened, then the scanning speed can be accelerated. Possible methods for shortening the horizontal read time are raising the electrical drive frequency or reducing the number of read pixels, or the like.

Furthermore, as the arrangement pitch of the one-dimensional pixel lines in the vertical direction becomes smaller, the light receiving regions of the pixels can be increased accordingly, and hence the sensitivity of the pixels can be raised. Moreover, since the light receiving regions of the pixels can be increased, then it is possible to ensure a prescribed sensitivity or above, even if the scanning speed is raised. Furthermore, by reducing the arrangement pitch of the one-dimensional pixel lines in the vertical direction, it is possible to make the apparatus more compact in size.

(2) Desirably, the arrangement pitch P satisfies the condition W≤P≤W·(n+1)/n, where W is a width in the vertical direction of a light receiving region of each pixel.

According to this composition, since the arrangement pitch P satisfies the condition P≤W·(n+1)/n, then it is possible to reduce the arrangement pitch of the one-dimensional pixel lines in the vertical direction. As the arrangement pitch is made smaller, the ratio of each pixel occupied by the light receiving region can be enlarged accordingly, and the sensitivity of each pixel can be improved.

(3) Desirably, the horizontal read time period is variable.

According to this composition, it is possible, for example to set the scanning speed to a desired value in accordance with the resolution and original document size, for example.

(4) Desirably, the vertical scanning circuit is constituted by a shift register.

According to this composition, the vertical scanning circuit is constituted by a shift register, and therefore it is possible to select a one-dimensional pixel line in accordance with the arrangement sequence in the vertical direction.

(5) Desirably, the vertical scanning circuit is constituted by a random access circuit.

According to this composition, since the vertical scanning circuit is constituted by a random access circuit, then it is possible to select a one-dimensional pixel line, regardless of the arrangement sequence.

(6) Desirably, the pixels are each constituted by a pixel circuit of a CMOS solid-state imaging element.

According to this composition, since the pixels are each constituted by a pixel circuit of a CMOS solid-state imaging element, then the pixel signals are amplified and then output, and the signals are not liable to be affected by noise in the signal transmission route.

The invention claimed is:

1. An image reader, comprising:
a pixel unit in which one-dimensional pixel lines each having a plurality of pixels arranged in a horizontal direction are arranged in n rows (where n is an integer no less than 2) in a vertical direction which is perpendicular to the horizontal direction;
a vertical movement unit which moves the pixel unit at a prescribed scanning speed in the vertical direction relatively to an object to be exposed;
a read circuit, which is provided so as to correspond to each column of the pixel unit, is common to respective columns and reads out pixel signals from the pixels;
a vertical scanning circuit which scans the pixel unit in the vertical direction; and
a control unit which causes the vertical scanning circuit to cyclically select a one-dimensional pixel line of any one row from the n rows of one-dimensional pixel lines each time a prescribed horizontal read time period elapses, controls the read circuit so as to read out pixel signals of the object that has been exposed by the selected one-dimensional pixel line, and controls the vertical movement unit in such a manner that the scanning speed S satisfies $$S=P/(H(n+1))$$

where P is an arrangement pitch in the vertical direction of the one-dimensional pixel lines and H is the horizontal read time period.

2. The image reader according to claim 1, wherein the arrangement pitch P satisfies the condition $$W \leq P \leq W \cdot (n+1)/n$$

where W is a width in the vertical direction of a light receiving region of each pixel.

3. The image reader according to claim 1, wherein the horizontal read time period is variable.

4. The image reader according to claim 1, wherein the vertical scanning circuit is constituted by a shift register.

5. The image reader according to claim 1, wherein the vertical scanning circuit is constituted by a random access circuit.

6. The image reader according to claim 1, wherein the pixels are each constituted by a pixel circuit of a CMOS solid-state imaging element.

* * * * *